United States Patent
Wei et al.

(10) Patent No.: US 12,001,838 B2
(45) Date of Patent: Jun. 4, 2024

(54) METHOD AND APPARATUS FOR MERGING A PLURALITY OF SOFTWARE CODE CHANGE VERSIONS

(71) Applicant: Huawei Cloud Computing Technologies Co., Ltd., Guizhou (CN)

(72) Inventors: Zhao Wei, Gui'an (CN); Guangtai Liang, Beijing (CN); Lin Li, Beijing (CN); Qianxiang Wang, Beijing (CN)

(73) Assignee: HUAWEI CLOUD COMPUTING TECHNOLOGY CO., LTD., Guizhou (CN)

(*) Notice: Subject to any disclaimer, the term of this patent is extended or adjusted under 35 U.S.C. 154(b) by 93 days.

(21) Appl. No.: 17/851,627

(22) Filed: Jun. 28, 2022

(65) Prior Publication Data
US 2022/0365775 A1    Nov. 17, 2022

Related U.S. Application Data

(63) Continuation of application No. PCT/CN2020/115692, filed on Sep. 16, 2020.

(30) Foreign Application Priority Data

Dec. 28, 2019 (CN) .......................... 201911383077.0

(51) Int. Cl.
*G06F 8/71* (2018.01)
*G06F 11/36* (2006.01)

(52) U.S. Cl.
CPC ............ *G06F 8/71* (2013.01); *G06F 11/3604* (2013.01)

(58) Field of Classification Search
USPC .................................................. 717/120–123
See application file for complete search history.

(56) References Cited

U.S. PATENT DOCUMENTS 6,678,882 B1 * 1/2004 Hurley .................... G06F 8/315
                                                     717/121
2013/0036400 A1 * 2/2013 Bak .......................... G06F 8/71
                                                     717/101
(Continued)

FOREIGN PATENT DOCUMENTS

CN    105956087 A    9/2016
CN    106406918 A    2/2017
(Continued)

OTHER PUBLICATIONS

Xuan J., et al., "Progress on Approaches to Automatic Program Repair," Journal of Software, 2016,27(4):771-784 [doi: 10.13328/j.cnki.jos.004972], with an English abstract, 14 pages.

(Continued)

*Primary Examiner* — Qing Chen
(74) *Attorney, Agent, or Firm* — Conley Rose, P.C.

(57) ABSTRACT

A method for merging a plurality of software code change versions, where a merging apparatus may first analyze code change areas in a software code preliminarily merged version and two different software code change versions. After change intents of the two code change areas are determined, the merging apparatus eliminates, based on a conflict elimination rule set and the change intents of the two code change areas, a conflict block in the software code preliminarily merged version.

20 Claims, 16 Drawing Sheets

(56) References Cited

U.S. PATENT DOCUMENTS

| | | | |
|---|---|---|---|
| 2014/0157232 A1* | 6/2014 | Li | G06F 8/48 717/110 |
| 2015/0220332 A1 | 8/2015 | Bernstein et al. | |
| 2019/0339964 A1 | 11/2019 | Young et al. | |
| 2020/0314145 A1* | 10/2020 | Bolignano | G06Q 10/103 |
| 2022/0365775 A1 | 11/2022 | Wei et al. | |

FOREIGN PATENT DOCUMENTS

| | | |
|---|---|---|
| CN | 108073501 A | 5/2018 |
| CN | 109343841 A | 2/2019 |
| CN | 109947462 A | 6/2019 |
| CN | 111221566 A | 6/2020 |

OTHER PUBLICATIONS

Asklund, U., "Identifying Conflicts During Structural Merge," LU-CS-TR:94-130, XP093017502, Jul. 29, 1995, 13 Pages.

Git, Retrieved from the internet: https://git-scm.com/, printed Feb. 15, 2023, 2 pages.

Niu, N., et al., "Conflict resolution support for parallel software development", IET Software, The Institution of Engineering and Technology, Michael Faraday House, Six Hills Way, Stevenage, Herts. SG1 2AY, UK, vol. 7, No. 1, XP006043705, Feb. 8, 2013, 11 Pages.

SVN, Retrieved from the internet: https://subversion.apache.org/, printed Feb. 15, 2023, 3 pages.

Miryung, K., et al., "Automatic Inference of Structural Changes for Matching across Program Versions", Software Engineering, 2008. ICSE"08., May 1, 2007, XP031096660, pp. 333-343.

Zhu, F., et al., "Conflict Resolution for Structured Merge via Version Space Algebra", Proceedings of the ACM on Programming Languages 2.OOPSLA (2018): 166., Nov. 2018, 25 pages.

Lillack, M., et al., "Intention-Based Integration of Software Variants", 2019 IEEE/ACM 41st International Conference on Software Engineering (ICSE), IEEE, XP033602764, May 25, 2019, 12 Pages.

Apel, S., et al. "Semistructured Merge in Revision Control Systems." VaMoS, Jan. 2010, 8 pages.

Wang, S., et al., "Leveraging Change Intents for Characterizing and Identifying Large-Review-Effort Changes", Proceedings of the Fifteenth International Conference on Predictive Models and Data Analytics in Software Engineering, XP093016871, Sep. 18, 2019, 10 Pages.

Cavalcanti, G., et al., "Evaluating and improving semistructured merge." Proceedings of the ACM on Programming Languages 1.OOPSLA (2017): 59., Oct. 2017, 27 pages.

Reiss, S., "Tracking source locations," In Software Engineering, 2008, ICSE 08, ACM/IEEE 30th International Conference on Software Engineering, May 10-18, 2008, 10 pages.

Asaduzzaman, M., et al., "LHDiff: A Language-Independent Hybrid Approach for Tracking Source Code Lines," 2013 IEEE International Conference on Software Maintenance, 2013, 10 pages.

Apel, S., et al., "FeatureHouse: Language-Independent, Automated Software Composition," In Proceedings of the International Conference on Software Engineering (ICSE), IEEE CS, 2009, pp. 221-231.

Falleri, J., et al., "Fine-grained and accurate source code differencing," Proceedings of the 29th ACM/IEEE International conference on Automated software engineering, ACM, 2014, Sep. 12, 2014, 12 pages.

* cited by examiner

FIG. 3B

| Sequence number | Code area | Function entity | First software code change version Change intent | Second software code change version Change intent | Conflict elimination solution |
|---|---|---|---|---|---|
| 1 | Import area | Import a | Delete | Not delete | Not delete |
| 2 | Import area | Import a | Delete | Delete | Delete |
| 3 | Import area | Import b | Add (added content is A) | Not added | Add (added content is A) |
| 4 | Import area | Import b | Add (added content is A) | Add (added content is B) | Add (added content is A and B) |
| 5 | Field definition area | Field a | Delete | Not delete | Not delete |
| 6 | Field definition area | Field a | Delete | Delete | Delete |
| 7 | Field definition area | Field a | Delete | Delete | Delete |
| 8 | Field definition area | Field a | Modify (modify to A) | Not modify | Modify (modify to A) |

FIG. 4A

| 9 | Field definition area | Field a | Modify (modify to A) | Modify (modify to B) | Modify to A or B (A and B are the same). Prompt that a conflict occurs (A and B are different) |
|---|---|---|---|---|---|
| 10 | Field definition area | Field b | Add (added content is A) | Not added | Add (added content is A) |
| 11 | Field definition area | Field b | Add (added content is A) | Add (added content is B) | Add (added content is A and B) |
| 12 | Method definition area | Method signature | Add (added content is A) | Not added | Add (added content is A) |
| 13 | Method definition area | Method signature | Add (add A) | Add (add B) | Add A or B (A and B are the same). Prompt that a conflict occurs (A and B are different) |
| 14 | Method definition area | Method signature | Modify | Not modify | Modify |
| 15 | Method definition area | Method signature | Modify (modify to A) | Modify (modify to B) | Modify to A or B (A and B are the same). Prompt that a conflict occurs (A and B are different) |

FIG. 4B

| 16 | Method definition area | Method signature | Modify | Delete | Prompt that a conflict occurs |
| 17 | Method definition area | Method signature | Delete | Not delete | Not delete |
| 18 | Method definition area | Method signature | Delete | Delete | Delete |
| 19 | Method definition area | Code area (block) a in a method | Modify (modify to A) | Add code (add B) outside the block a | Modify and add code (add B) outside the block a |
| 20 | Method definition area | Code area (block) a in a method | Modify (modify to A) | Modify (modify to B) | Modify to A or B (A and B are the same). Prompt that a conflict occurs (A and B are different) |
| 21 | Method definition area | Code area (block) a in a method | Modify (modify to A) | Not modify | Modify (modify to A) |
| 22 | Method definition area | Code area (block) a in a method | Delete | Not delete | Not delete |
| 23 | Method definition area | Code area (block) a in a method | Delete | Delete | Delete |
| 24 | Method definition area | Code area (block) a in a method | Delete | Modify | Prompt that a conflict occurs |
| 25 | Method definition area | Code area (block) a in a method | Add code (add A) outside the block a | Not add | Add code (add A) outside the block a |

FIG. 4C

| 26 | Method definition area | Code area (block) a in a method | Add code (add A) outside the block a | Add code (add B) outside the block a | Add A and B (positions for adding A and B are different in the two versions). Prompt that a conflict occurs (positions for adding A and B are the same in the two versions) |
|---|---|---|---|---|---|
| 27 | Method definition area | Code area (block) a in a method | Add code (add A) outside the block a | Modify (modify to B) | Modify (modify to B) and add code (add A) outside the block a |
| 28 | Method definition area | Code area (block) a in a method | Add code (add A) outside the block a | Delete | Delete and add code (add A) outside the block a |
| 29 | Method definition area | Code area (block) a in a method | Add (add A) | Not add | Add (add A) |
| 30 | Method definition area | Code area (block) a in a method | Add (add A) | Add (add B) | Add A or B (A and B are the same). Prompt that a conflict occurs (A and B are different) |

METHOD AND APPARATUS FOR MERGING A PLURALITY OF SOFTWARE CODE CHANGE VERSIONS

CROSS-REFERENCE TO RELATED APPLICATIONS

This is a continuation of International Patent Application No. PCT/CN2020/115692 filed on Sep. 16, 2020, which claims priority to Chinese Patent Application No. 201911383077.0 filed on Dec. 28, 2019. The disclosures of the aforementioned applications are hereby incorporated by reference in their entireties.

TECHNICAL FIELD

This disclosure relates to the field of computer technologies, and in particular, to a method and an apparatus for merging a plurality of software code change versions.

BACKGROUND

When software code is changed, if there are a plurality of software code change versions for same software code, the plurality of software code change versions needs to be merged.

Git is used as a distributed code control and management tool. A plurality of software code change versions can be merged by using Git, to output a merged software code version.

However, a manner of merging the plurality of software code change versions by using Git is a text-based software code merging manner. To be specific, a code line or character of software code is used as a unit to detect a change in each software code change version for a same code line or character, and then merging is performed.

In this text-based software code merging manner, semantic analysis cannot be accurately performed on changed code in a software code change version, and the plurality of software code change versions cannot be properly merged. The output merged software code version has a large quantity of conflict blocks, where a conflict block refers to a code area that Git cannot merge.

It is clear that accuracy of the current manner of merging the plurality of software code change versions is poor.

SUMMARY

This disclosure provides a method for merging a plurality of software code change versions, to accurately eliminate a conflict block in a software code preliminarily merged version.

According to a first aspect, this disclosure provides a method for merging a plurality of software code change versions. The method may be performed by a merging apparatus. In the method, the merging apparatus may first analyze a software code preliminarily merged version, a first software code change version, and a second software code change version. For example, a first code area in the first software code change version of a conflict block and a second code area in the second software code change version of the conflict block in the software code preliminarily merged version may be located, and change intents of the first code area and the second code area are analyzed.

After determining the change intents of the first code area and the second code area, the merging apparatus eliminates, based on a conflict elimination rule set, the change intent of the first code area, and the change intent of the second code area, the conflict block, that is, eliminates a conflict in the conflict block, and outputs a software code preliminarily merged version without the conflict block. The merging apparatus may display the software code preliminarily merged version without the conflict block for a user to view, and may also send the software code preliminarily merged version without the conflict block to another apparatus, so that the other apparatus displays the software code preliminarily merged version without the conflict block.

According to the foregoing method, the merging apparatus no longer eliminates, based on a text, a conflict block in a software code preliminarily merged version, but analyzes the change intents of different software code change versions and eliminates the conflict block. This can ensure accuracy of conflict block elimination and efficiently merge the plurality of software code change versions.

In a possible implementation, if there are still some uneliminated conflict blocks in the software code preliminarily merged version, the merging apparatus may invoke a prediction model to eliminate the conflict blocks in the software code preliminarily merged version. The prediction module is pre-trained, and can output a model of a conflict elimination solution of a conflict block based on the input conflict block.

According to the foregoing method, in addition to eliminating, based on the conflict elimination rule, the conflict block in the software code preliminarily merged version, the merging apparatus can further eliminate, by using the prediction model, the conflict block in the software code preliminarily merged version, so that as many conflict blocks in the software code preliminarily merged version can be eliminated as possible, accuracy of merging the plurality of software code change versions can be ensured, and efficiency of merging the plurality of software code change versions can be improved.

In a possible design, in addition to some marked conflict blocks, some implicit conflicts that are not warned, that is, some ignored conflicts, may exist in the software code preliminarily merged version. To discover these conflicts, the merging apparatus may analyze the conflict block and the unilateral change block in the software code preliminarily merged version, determine whether an association exists between the unilateral change blocks and whether an association exists between the unilateral change block and the conflict block, and after determining that the association relationship exists between the unilateral change blocks and/or the association relationship exists between the unilateral change block and the conflict block, the merging apparatus may prompt that an implicit conflict exists based on the association relationship between the unilateral change blocks and/or the association relationship between the unilateral change block and the conflict block.

According to the foregoing method, the merging apparatus can further find some implicit conflicts in the software code preliminarily merged version, and give a warning, so that the user subsequently views the implicit conflicts and modifies the software code preliminarily merged version.

In a possible design, when determining the change intent of the first code area, the merging apparatus may first generate a change action set (or a first change action set) of the first code area. The first change action set includes at least one change action in the first code area for an original code area in an original software code (that is, the code area corresponding to the original software code of the conflict block). Then, the merging apparatus invokes the plurality of change analyzers to analyze the first change action set, and determines the change intent of the first code area.

Similarly, when determining the change intent of the second code area, the merging apparatus may first generate a change action set of the second code area (or a second change action set). The second change action set includes at least one change action in the second code area for the original code area in the original software code. Then, the merging apparatus invokes the plurality of change analyzers to analyze the second change action set, and determines the change intent of the second code area.

According to the foregoing method, the merging apparatus determines the change intent of the code change area (the first code area and the second code area) based on the change action set (the first change action set or the second change action set). The change intent determined in this manner is more accurate, and a change that needs to be implemented in the code change area can be better understood.

In a possible design, the association relationship between the unilateral change blocks includes at least one of the following: a reference relationship of a function between the unilateral change blocks, a modification relationship of a function between the unilateral change blocks (that is, whether a modification operation is performed on a same function), a reference relationship of a variable between the unilateral change blocks, and a modification relationship of a function between the unilateral change blocks (that is, whether a modification operation is performed on a same variable).

The association relationship between the unilateral change block and the conflict block includes at least one of the following: a reference relationship of a function between the unilateral change block and the conflict block (which may also be understood as code change areas of different software code change versions of the conflict block), a modification relationship of a function between the unilateral change block and the conflict block, a reference relationship of a variable between the unilateral change block and the conflict block, and a modification relationship of a variable between the unilateral change block and the conflict block.

According to the foregoing method, the merging apparatus can more accurately locate an implicit conflict in the software code preliminarily merged version based on the association relationship between the unilateral change blocks and the association relationship between the unilateral change block and the conflict block.

In a possible design, when generating the first change action set, the merging apparatus may first construct a syntax tree of the original software code, a syntax tree of the first software code change version, and a syntax tree of the second software code change version, and then determine the first change action set based on the syntax tree of the original software code and the syntax tree of the first software code change version.

Similarly, when generating the second change action set, the merging apparatus may first construct a syntax tree of the original software code, a syntax tree of the second software code change version, and a syntax tree of the second software code change version, and then determine the second change action set based on the syntax tree of the original software code and the syntax tree of the second software code change version.

According to the foregoing method, the merging apparatus compares the syntax tree of the original software code with the syntax tree of the software code change version, so that a change action to be performed in the code change area can be determined more accurately, and the change action set is generated.

According to a second aspect, an embodiment of this disclosure further provides a merging apparatus. For beneficial effects, refer to the description of the first aspect. Details are not described herein again. The apparatus has a function of implementing the behavior in the method example in the first aspect. The functions may be implemented by hardware, or may be implemented by hardware executing corresponding software. The hardware or the software includes one or more modules corresponding to the foregoing function. In a possible design, a structure of the apparatus includes an intent understanding module, an explicit conflict elimination module, and an implicit conflict warning module. These modules may perform corresponding functions in the method examples in the first aspect. For details, refer to the detailed descriptions in the method examples. Details are not described herein again.

According to a third aspect, an embodiment of this disclosure further provides a computing device. The computing device includes a processor and a memory, and may further include a communications interface and a display. The processor executes a program instruction in the memory to perform the method provided in any one of the first aspect or the possible implementations of the first aspect. The memory is coupled to the processor, and stores program instructions and data that are necessary in a process of determining traffic flows. The communications interface is configured to communicate with other devices, for example, to receive an original software code, a first software code change version, and a second software code change version, and for another example, to send a software code preliminarily merged version in which a conflict block is eliminated (and an implicit conflict is marked). The display is configured to display, when triggered by the processor, software code whose explicit conflict is eliminated to a user, and may further display an implicit conflict in the software code.

According to a fourth aspect, this disclosure provides a computing device cluster. The computing device cluster includes at least one computing device. Each computing device includes a memory and a processor. The processor in the at least one computing device is configured to access code in the memory to perform the method according to any one of the first aspect or the possible implementations of the first aspect.

According to a fifth aspect, this disclosure provides a non-transient readable storage medium. When the non-transient readable storage medium is executed by a computing device, the computing device performs the method according to any one of the first aspect or the possible implementations of the first aspect. The storage medium stores a program. The storage medium includes but is not limited to a volatile memory, for example, a random-access memory (RAM), or a non-volatile memory, such as a flash memory, a hard disk drive (HDD), and a solid-state drive (SSD).

According to a sixth aspect, this disclosure provides a computing device program product. The computing device program product includes computer instructions. When the computer instructions are executed by a computing device, the computing device is enabled to perform the method provided in any one of the first aspect or the possible implementations of the first aspect. The computer program product may be a software installation package. When the method provided in any one of the first aspect or the possible implementations of the first aspect needs to be used, the computer program product may be downloaded to and executed on the computing device.

According to a seventh aspect, this disclosure further provides a computer chip. The chip is connected to a memory, and the chip is configured to read and execute a software program stored in the memory, to perform the method according to any one of the first aspect or the possible implementations of the first aspect.

BRIEF DESCRIPTION OF DRAWINGS

FIG. 3B is a schematic diagram of a change intent of a code area according to this disclosure;

FIG. 4A, FIG. 4B, FIG. 4C, and FIG. 4D are a schematic diagram of a conflict elimination rule according to this disclosure;

FIG. 7B is a schematic diagram of software code after a conflict block is eliminated according to this disclosure;

FIG. 8B is another schematic diagram of software code after a conflict block is eliminated according to this disclosure;

DESCRIPTION OF EMBODIMENTS

Figure 1:
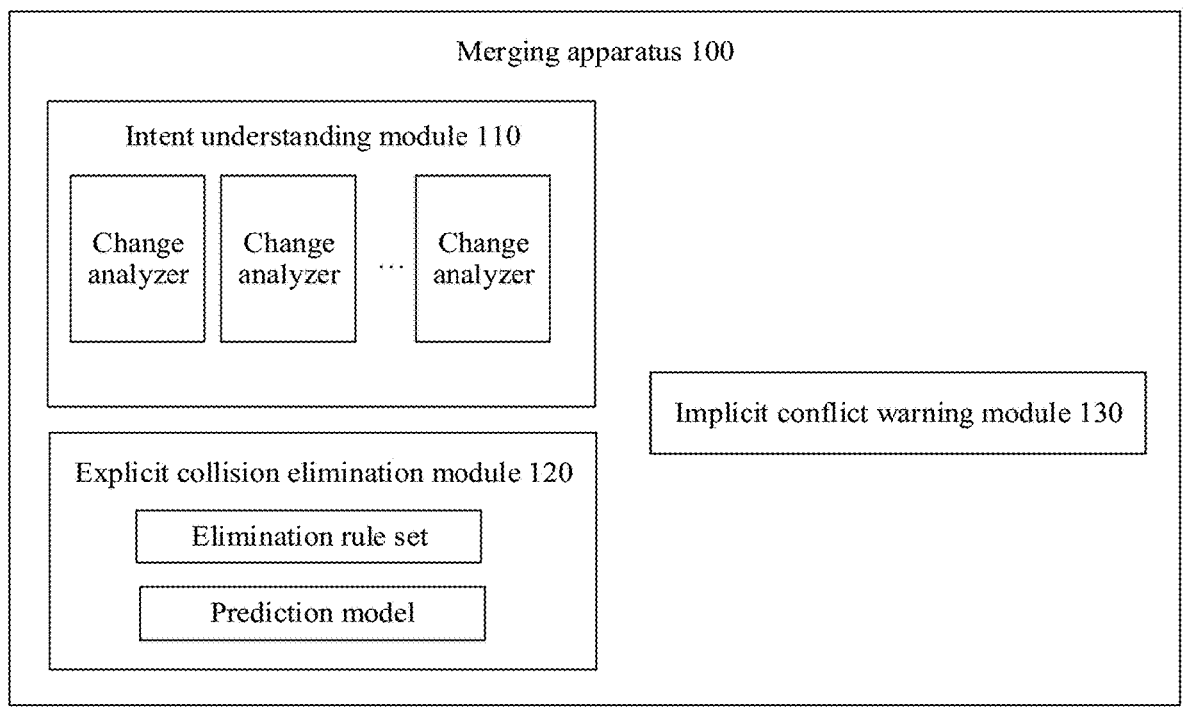
FIG. 1 is a schematic diagram of a structure of a merging apparatus according to this disclosure.

Before the method for merging a plurality of software code change versions provided in the embodiments of this disclosure is described, concepts in the embodiments of this disclosure are first described.

(1) Original Software Code, Software Code Change Version, and Software Code Preliminarily Merged Version:

The software code is compiled by a programmer by using a language supported by a development tool. The software code includes a collection of digits or letters that points to an object. The software code includes a plurality of lines of code, a line number is set for each line, and the line of code is identified by the line number.

The original software code is software code that is not changed. The software code change version refers to software code that is changed based on the original software code. A quantity of software code change versions is not limited in this embodiment of this disclosure. In this embodiment of this disclosure, two software code change versions (which are respectively referred to as a first software code change version and a second software code change version for ease of differentiation) are used as an example for description. When there are more than two software code change versions, a manner of merging a plurality of software code change versions is similar to a manner of merging two software code change versions. Details are not described in this embodiment of this disclosure.

The software code preliminarily merged version is software code generated by preliminarily merging software code change versions. For example, the software code preliminarily merged version is software code generated by using Git to merge software code change versions. A manner of generating the software code preliminarily merged version is not limited in this embodiment of this disclosure. In this embodiment of this disclosure, there are a large quantity of merging conflicts in the software code preliminary merged version, that is, there are a large quantity of conflict blocks, and there may be some undiscovered merging conflicts. In this embodiment of this disclosure, the conflict block in the software code preliminarily merged version can be eliminated, and a merging conflict that is not found before in the software code preliminarily merged version can be found and prompted.

It should be noted that, to distinguish software code changed in the training sample in a training set when a prediction model is generated, the software code changed in the training sample in the training set is referred to as original code.

(2) Class, Inner Class, Package, Function/Method, and Field/Variable:

A compilation specification, such as object-oriented programming (OOP) or procedure-oriented programming (POP), needs to be met in a process of compiling software code. Programming languages of the OOP include C++, JAVA, C#, and the like. Programming languages of the POP include FORTRAN, C, and the like.

Software code compiled according to a compilation specification may include code elements such as a class, a package, a function/method, and a field/variable. A package may include one or more classes. Each class may include an inner class and a function/method. A field/variable may be called in the function/method. The inner class is similar to the class, and the inner class may also include a function/method.

The class is a construction of an object-oriented computer programming language in the OOP, and describes a common method and field of created objects. The inner class is a class included in a class.

The function/method is a subroutine in the class. A method usually includes a series of statements and can perform a function. It is referred to as a method in the compilation specification of OOP, and referred to as a function in the compilation specification of POP.

The field/variable stores some data, such as an integer and a character, a string, a hash table, and a pointer.

The package is used to describe a path structure of a program. A package usually includes a plurality of classes. When a class is referenced, a complete package path needs to be filled in a package import area.

(3) Conflict Block and Unilateral Change Block:
1. Conflict Block:
For a code area (which may be referred to as an original code area) of original software code, if two software code change versions make different changes to the code area, two different change behaviors generate two different code change areas, and a block formed by the two different code change areas and the original code area is referred to as the conflict block. A specific identifier can be set for a conflict block in a software code preliminarily merged version, so that a user can view the conflict block.

In this embodiment of this disclosure, a code change area corresponding to the code area in a first software code change version is referred to as a first code area, and a code change area corresponding to the code area in a second software code change version is referred to as a second code area. In other words, the first code area is a change area of the code area in the first software code change version, and the second code area is a change area of the code area in the second software code change version.

There are many reasons why the software code preliminarily merged version does not merge the change in the code area in the two software code change versions. For example, a tool (for example, Git) that preliminarily merges software code cannot merge the change in the code area in the two software code change versions.

It should be noted that, to distinguish between code change areas used in a training sample in a training set when a prediction model is generated, the code change areas used in the training sample in the training set are referred to as a first change area and a second change area. The code change areas used in the training sample may be code areas different from the first code area and the second code area.

2. Unilateral Change Block:

For a code area of the original software code, if the code area is changed in only one software code change version in two software code change versions, an area corresponding to the code area in the software code preliminarily merged version is a unilateral change block. Usually, the unilateral change block is an area obtained after the code area is changed in the software code change version.

(4) Explicit Conflict and Implicit Conflict:

In this embodiment of this disclosure, a merged conflict existing in a software code preliminarily merged version is classified into two types: explicit conflict and implicit conflict.

The explicit conflict is a conflict shown by a conflict block in the software code preliminarily merged version, and is a conflict block that has been marked in the software code preliminarily merged version.

The implicit conflict is a conflict that is not prompted in the software code preliminarily merged version but that is caused by a compilation error due to unilateral change blocks that have an association relationship.

In this embodiment of this disclosure, implicit conflicts are classified into two types. One is an implicit conflict caused by unilateral change blocks that have the association relationship, and the other is an implicit conflict caused by a unilateral change block and a conflict-free conflict block that have the association relationship.

For example, a variable ApK exists in a code area A in the original code area, a variable name of the code area is changed to mloadedApK in the first software code change version, and the code area is not changed in the second software code change version. When Git is used to merge a plurality of software code change versions, the change in the first software code change version is used in the code area A in the software code preliminarily merged version. In the software code preliminarily merged version, the area corresponding to the software area A is the unilateral change block. If a value is assigned to the variable ApK in a code area B in the original code area, and ApK=3, the code area is not changed in the first software code change version, a value assigned to the variable in the code area is changed in the second software code change version, and ApK=3 is changed to ApK=4. When a plurality of software code change versions is merged by using Git, in the software code preliminarily merged version, the code area B adopts the change in the second software code change version. In the preliminarily merged version of the software code, the area corresponding to the code area B is another unilateral change block. In this case, a variable name of the area corresponding to the code area A has been changed, but a variable name of the area corresponding to code area B has not been changed. This conflict is not detected in Git and is an implicit conflict caused by the unilateral change blocks that have the association relationship.

The implicit conflict caused by the unilateral change block and the conflict-free conflict block that have the association relationship is similar to the implicit conflict caused by the unilateral change blocks that have the association relationship.

For example, when the variable ApK exists in the code area A in the original code area, a variable name of the code area is changed to mloadedApK in the first software code change version, and a variable name of the code area is changed to mloadedinfo in the second software code change version. When a plurality of software code change versions is merged by using Git, the code area A cannot be merged, and a conflict block is formed. In the software code preliminarily merged version, the area corresponding to the software area A is a conflict block. If a value is assigned to the variable ApK in the code area B in the original code area, and ApK=3, the code area is not changed in the first software code change version, a value assigned to the variable in the code area is changed in the second software code change version, and mloadedinfo=3 is changed to mloadedinfo=4. A plurality of software code change versions is merged by using Git, in the software code preliminarily merged version, the code area B will adopt the change in the second software code change version. In this case, if the conflict existing in the conflict block is eliminated, the conflict is eliminated by using the change in the code area in the first software code change version, that is, the variable name of the variable ApK in the area corresponding to the code area A in the software code preliminarily merged version is changed to mloadedApK. However, mloadedinfo=4 is still used in the code area B. As a result, an implicit conflict exists in the software code preliminarily merged version. The implicit conflict is an implicit conflict caused by the unilateral change block and the conflict-free conflict block that have the association relationship.

(5) Abstract Syntax Tree (AST), and Node of the Syntax Tree:

The abstract syntax tree may also be referred to as a syntax tree, and is an abstract representation of a syntax structure of software code. A syntax tree represents a syntax structure of a programming language in a form of a tree. Each node on the tree represents a structure in software code, for example, may represent a variable, a function, or a method. In this embodiment of this disclosure, n represents a quantity of AST node types.

(6) Change Action Set, Change Action:

In this embodiment of this disclosure, the change action set is used to indicate a set of change actions for an original code area in a code change area in the software code change version. The change actions include a change operation and an AST node type.

In this embodiment of this disclosure, the change operation includes but is not limited to: add, modify (change), move, and delete.

In this embodiment of this disclosure, a change action set of a first code area is referred to as a first change action set, and a change action set of a second code area is referred to as a second change action set. To distinguish the change action sets related to a training sample in a training set when a prediction model is generated, the change action set related to the training sample in the training set is referred to as a change action set 1 and a change action set 2. Because the code change area in the training sample may be a code area different from the first code area and the second code area, the change action set 1 and the change action set 2 may also be different from the first change action set and the second change action set.

(7) Change Analyzer, and Change Intent:

In this embodiment of this disclosure, a plurality of change analyzers may be constructed. Each change analyzer may analyze a change purpose or intent of a change action set of a code area (for example, the first code area and the second code area). For example, the change purpose or intent is to change (for example, add, modify, move, or delete) a statement, a variable, a function, or a class in the code area.

The change analyzer in the embodiments of this disclosure includes but is not limited to: a variable analyzer, a control flow statement change analyzer (control flow analyzer), a log change statement analyzer (log analyzer), a function signature transformation analyzer (function analyzer), a function invoke transformation analyzer (function invoke analyzer), a class or interface analyzer, and an expression statement analyzer (expression analyzer).

The variable analyzer can analyze, based on the change action set, whether a variable exists in the code area and whether a renaming operation is performed on the variable. The change intent determined by the variable analyzer is that the variable is renamed in the code area.

The control flow statement change analyzer can determine, based on the change action set, whether a change in statements or expressions such as if, while, do-while, for, switch and try-catch in the code area occurs in a condition or a change body, so as to determine whether a change in a control flow statement exists. The change intent determined by the control flow statement change analyzer is that the control flow statement in the code area changes.

The log change statement analyzer can analyze, based on the change action set, whether there are log-related statement changes, such as log and trace statement changes. The change intent determined by the log change statement analyzer is that the statement of the log in the code area changes.

The function signature transformation analyzer can analyze a modifier change, a function parameter type change, and a function parameter name change in a function signature based on the change action set to determine whether the function changes. The change intent determined by the function signature transformation analyzer is that a function in the code area changes.

The function invoke transformation analyzer can analyze a change in an owner and a change in a function invoke parameter in the function invoke based on the change action set. The change intent determined by the function invoke transformation analyzer is that an invoke manner of a function in the code area changes.

The class interface analyzer can analyze, based on the change action set, changes in a class or an interface, including a name, an inherited class, or an implemented interface. The change intent determined by the class interface analyzer is that the class or interface in the code area changes.

The expression statement analyzer can analyze a change in a variable or value of an expression based on the change action set. The change intent determined by the expression statement analyzer is that the expression in the code area changes.

FIG. 1 shows a merging apparatus 100 according to an embodiment of this disclosure. The merging apparatus 100 includes an intent understanding module 110, an explicit conflict elimination module 120, and an implicit conflict warning module 130.

The intent understanding module 110 analyzes a first code area in a first software code change version and a second code area in a second software code change version of a conflict block in a software code preliminarily merged version, and determines a change intent of the first code area and a change intent of the second code area.

The intent understanding module 110 includes one or more change analyzers, which may analyze the change intent of the first code area and the change intent of the second code area.

The explicit conflict elimination module 120 includes a conflict elimination rule set, and may further include a prediction model. The explicit conflict elimination module 120 may eliminate the conflict blocks in a preliminarily merged version based on the conflict elimination rule set, the change intent of the first code area, and the change intent of the second code area, and the explicit conflict elimination module 120 may further invoke a prediction model to eliminate the conflict block in the software code preliminarily merged version.

The implicit conflict warning module 130 analyzes a unilateral change block in the conflict block in the software code preliminarily merged version, determines an association relationship between unilateral change blocks and an association relationship between unilateral change block and the conflict block, determines, based on the association relationship between the unilateral change blocks and the association relationship between the unilateral change block and the conflict block, an implicit conflict in the software code preliminarily merged version, and prompts that an implicit conflict exists.

Although not shown, an embodiment of this disclosure further provides a training apparatus. The training apparatus is configured to train a prediction model, and send the trained prediction model to the explicit conflict elimination module 120, so that the explicit conflict elimination module 120 invokes the prediction model to eliminate the conflicting block in the software code preliminary merging version.

Figure 2:
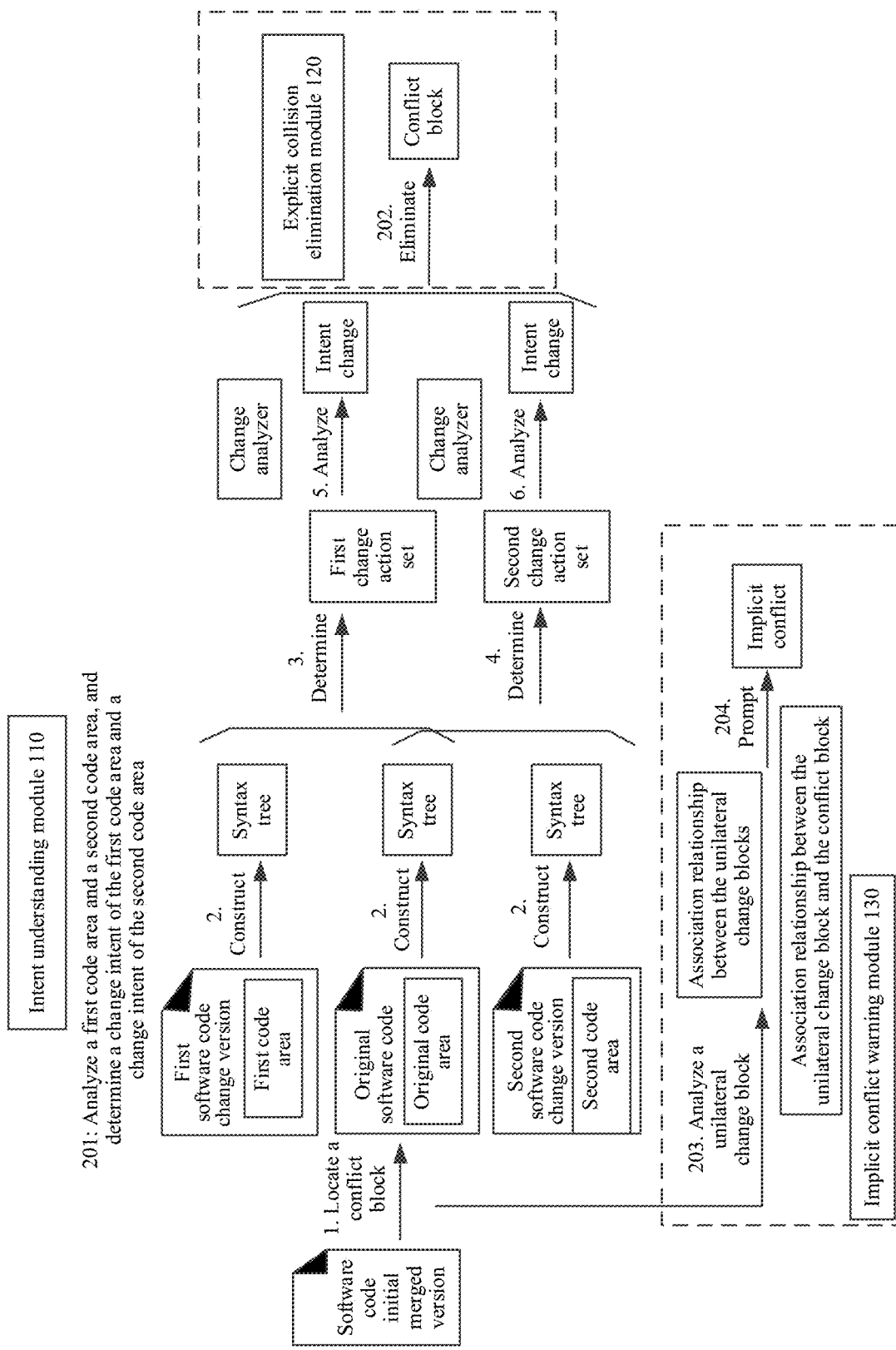
FIG. 2 is a schematic diagram of a method for merging a plurality of software code change versions according to this disclosure.

The following describes, with reference to FIG. 2, a method for merging a plurality of software code change versions according to an embodiment of this disclosure. Refer to FIG. 2. The method may be divided into two parts. One part is an explicit conflict elimination method (referring to step 201 to step 202), and the other part is an implicit conflict warning method (referring to step 203 to step 204). The two parts may be independently performed, or may be jointly performed (in other words, both explicit conflict elimination and implicit conflict warning are performed). During joint execution, an execution sequence of the two parts is not limited in this embodiment of this disclosure. In this embodiment of this disclosure, that the implicit conflict warning method is performed after the explicit conflict elimination method is performed is merely used as an example for description. The following describes the method.

Step 201: The intent understanding module 110 analyzes a first code area in a first software code change version and a second code area in a second software code change version of a conflict block in a software code preliminarily merged version, and determines a change intent of the first code area and a change intent of the second code area.

It should be noted that a quantity of conflict blocks is not limited in this embodiment of this disclosure, and there may be one or more conflict blocks. For each conflict block, the intent understanding module 110 first determines the first code area in the first software code change version and the second code area in the first software code change version that are of the conflict block.

Step 1: The intent understanding module 110 first locates the conflict block in the software code preliminarily merged version. For example, a tool that initially performs software code merging is Git (that is, a tool that outputs the software code preliminarily merged version is Git). The conflict block in the software code preliminarily merged version is usually marked by using specific identifiers, and the identifiers include but are not limited to <<<<<<, ||||||, ======, and >>>>>>>.

The conflict block marked in the software code preliminarily merged version output by Git records the first code area in the first software code change version, an original code area of an original software code, and the second code area in the second software code change version. For example, a code area between "<<<<<<" and "||||||" is the first code area." A code area between "||||||" and "======" is the original code area." A code area between "======" and ">>>>>>>" is the second code area.

Step 2: The intent understanding module 110 separately constructs a syntax tree of the original software code, a syntax tree of the first software code change version, and a syntax tree of the second software code change version.

Step 3: The intent understanding module 110 determines a first change action set of first software code based on the syntax tree of the original software code and the syntax tree of the first software code change version, where the first change action set records a set of change actions that are based on the original software code and that are in the first code area.

The intent understanding module 110 may use a Gumtree code change action identification algorithm to identify the first change action set based on the syntax tree of the original software code and the syntax tree of the first software code change version.

Step 4: The intent understanding module 110 determines a second change action set of second software code based on the syntax tree of the original software code and the syntax tree of the first software code change version, where the second change action set records a set of change actions that are based on the original code area and that are in the second code area. An execution manner of step 4 is similar to that of step 3. Details are not described herein again.

Step 5: The intent understanding module 110 invokes a change analyzer to analyze the first change action set, and determines the change intent of the first code area.

The intent understanding module 110 includes a plurality of change analyzers, and the intent understanding module 110 may separately invoke the plurality of change analyzers to analyze the first change action set.

The following uses a variable analyzer as an example to describe a manner in which the change analyzer analyzes the first change action set.

The variable analyzer may analyze an identifier related to each change action in the first change action set, analyze whether the identifier is a variable, and then analyze whether a variable renaming operation is performed on the identifier, so as to determine whether a change intent of variable renaming exists in the first code area.

Step 6: The intent understanding module 110 invokes the change analyzer to analyze the second change action set, and determines the change intent of the second code area. An execution manner of step 6 is the same as that of step 5. Details are not described herein again. For details, refer to the foregoing content.

Figure 3A:
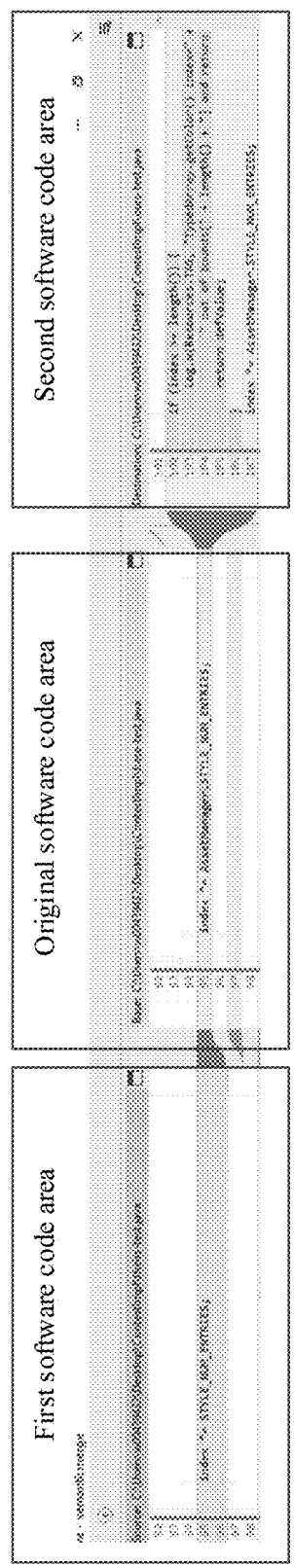
FIG. 3A is a schematic diagram of a conflict block in a software code preliminarily merged version according to this disclosure.

FIG. 3A shows the first code area, the original code area, and the second code area corresponding to the conflict block in the software code preliminarily merged version. A first block diagram is the first code area in the first software code change version, a second block diagram is the original code area in the original software code, and the second block diagram is the second code area in the second software code change version.

Figure 3B:
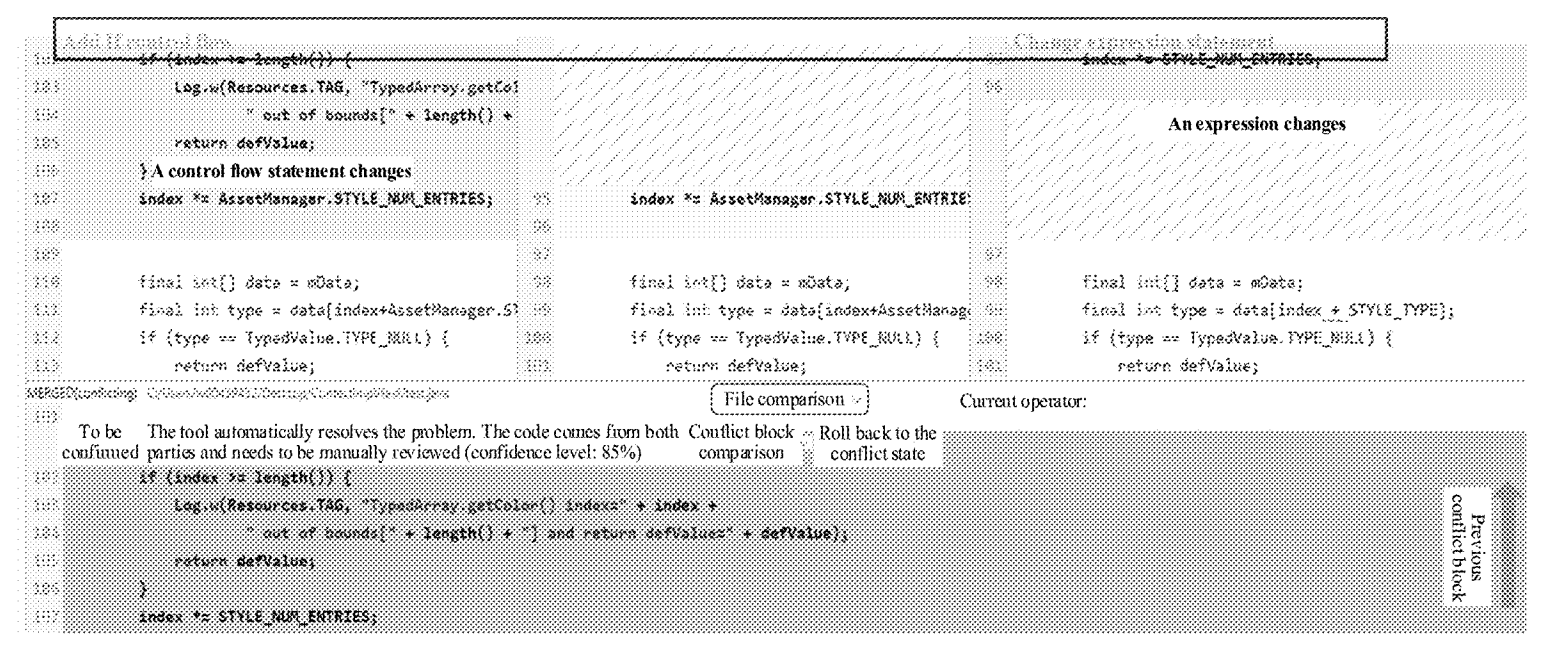

As shown in FIG. 3B, FIG. 3B shows the change intent of the first code area and the change intent of the second code area that are determined by invoking the change analyzer. A linear box in FIG. 3B circles the change intent of the first code area and the change intent of the second code area. A control flow analyzer is invoked to determine that the change intent of the first code area is that a control flow statement changes, and an expression analyzer is invoked to determine that the change intent of the first code area is that an expression changes.

Step 202: The explicit conflict elimination module 120 eliminates the conflict blocks in the software code preliminarily merged version based on the change intent of the first code area and the change intent of the second code area.

After determining the change intent of the first code area and the change intent of the second code area, the explicit conflict elimination module 120 may eliminate the conflict block.

In this embodiment of this disclosure, there are two manners of eliminating the conflict block in the software code preliminarily merged version. The two manners are separately described in the following.

In a first manner, the explicit conflict elimination module 120 eliminates, based on a conflict elimination rule set, the change intent of the first code area, and the change intent of the second code area, the conflict block in the software code preliminarily merged version.

The explicit conflict elimination module 120 may save the conflict elimination rule set, where the conflict elimination rule set includes one or more conflict elimination rules, and each conflict elimination rule records a conflict elimination solution used for merging code change areas in different software code change versions for the conflict block.

The conflict elimination rule set may be preset. Specific content recorded in the conflict elimination rule is not limited in this embodiment of this disclosure. FIGS. 4A-4D show the conflict elimination rule provided in this embodiment of this disclosure. Content recorded in each row is one conflict elimination rule. The code area indicates a type of code changed in the different software code change versions, and the action entity is the code changed in the different software code change versions.

When the first code area and the change intent of the first code area are modification, A is used to indicate content modified in the first code area, and B is used to indicate content modified in the second code area. When the first code area and the change intent of the first code area are both adding (including adding outside the code area), A is used to indicate content to be added in the first code area, and B is used to indicate content to be added in the second code area.

A conflict elimination rule whose sequence number is 1 is used as an example. The conflict elimination rule records that a change intent of the first code area for an import a is deletion, and a change intent of the second code area for the import a is no deletion. A finally used conflict solution is no deletion.

A conflict elimination rule whose sequence number is 9 is used as an example. The conflict elimination rule records that a change intent executed by the first code area for a field a is modification, and a change intent executed by the first code area for the field a is also modification. A finally used conflict solution is as follows.

When content A obtained after the field a is modified in the first code area is the same as content B obtained after the field a is modified in the second code area (that is, A is the same as B), the field a is modified to A or B.

When the content A obtained after the field a is modified in the first code area is different from the content B obtained after the field a is modified in the second code area (that is, A is different from B), a prompt is given that a conflict exists.

FIGS. 4A-4D show only some conflict elimination rules. In addition to the conflict elimination rules shown in FIGS. 4A-4D, this embodiment of this disclosure further provides the following conflict elimination rules.

Rule 1: Two software code change versions are for a same original code area. One is a control flow statement change, and the other is a log statement change. A conflict elimination solution is to merge the log statement change based on the control flow statement change.

Rule 2: Two software code change versions are for the same original code area. One is a control flow statement change, and the other is a variable change. A conflict elimination solution is to merge the variable change based on the control flow statement change.

Rule 3: Two software code change versions are for the same original code area. One is a modifier change, and the other is a function parameter change. The conflict elimination solution is to merge the modifier change and the function parameter change.

Rule 4: Two software code change versions are for the same original code area being empty or being a comment statement. A conflict elimination solution is to sequentially display code change areas (for example, a first software code area and a second software code area) corresponding to the original code area in the software code change version based on a specified sequence. For example, the first software code area is displayed in the upper part, and the second software code area is displayed in the lower part.

Rule 5: Two software code change versions are for the same original code area. One is a function invoke change, and the other is a log statement change. The conflict elimination solution is to merge the log statement change based on the function invoke change.

Rule 6: Two software code change versions are for the same original code area. A code change area of one software code change version includes the original code area, and a code change area of the other software code change version does not include the original code area. The conflict elimination solution is to use a code change area that includes the original code area.

Rule 7: Two software code change versions are for the same original code area. A code change area of one software code change version includes a code change area of the other software code change version. The conflict elimination solution is to use the code change area that includes the code change area of the other software code change version.

Some common conflict blocks can be eliminated by using the conflict elimination rule set. A software code preliminarily merged version may include some conflict blocks that cannot be eliminated by using the conflict elimination rule set. For a remaining uneliminated conflict block, it may be determined whether the conflict block is an irremovable conflict block. For example, in the conflict block, the first software code change version and the second software code change version use different change operations for a same line of code. If the conflict block cannot be eliminated, it may be prompted that the conflict block cannot be eliminated. Otherwise, it is considered that the conflict block can be eliminated. The second manner may be used for such the conflict block that is not eliminated in the first manner and that is determined to be eliminated.

In a second manner, the explicit conflict elimination module 120 invokes a prediction model to eliminate the conflict block in the software code preliminarily merged version. The prediction model is used to output a conflict elimination solution for the conflict block based on the conflict block in the software code preliminarily merged version.

An accuracy degree of the prediction model is related to a training method and a training set of the prediction model. The following describes a manner of constructing the training set of the prediction model by the training apparatus.

First, the training apparatus determines a plurality of initial training samples. Each initial training sample includes change action sets in a code change area in original code in two different software code change versions, and a merging policy used when the two code change areas are merged. A merging policy used to merge the two change areas in each training initial sample may be collected in advance. For example, the change action set used when the two change areas are merged may be a merging policy manually used when a manual conflict elimination manner is performed. The merging policy can also be understood as a conflict resolution solution.

Figure 5:
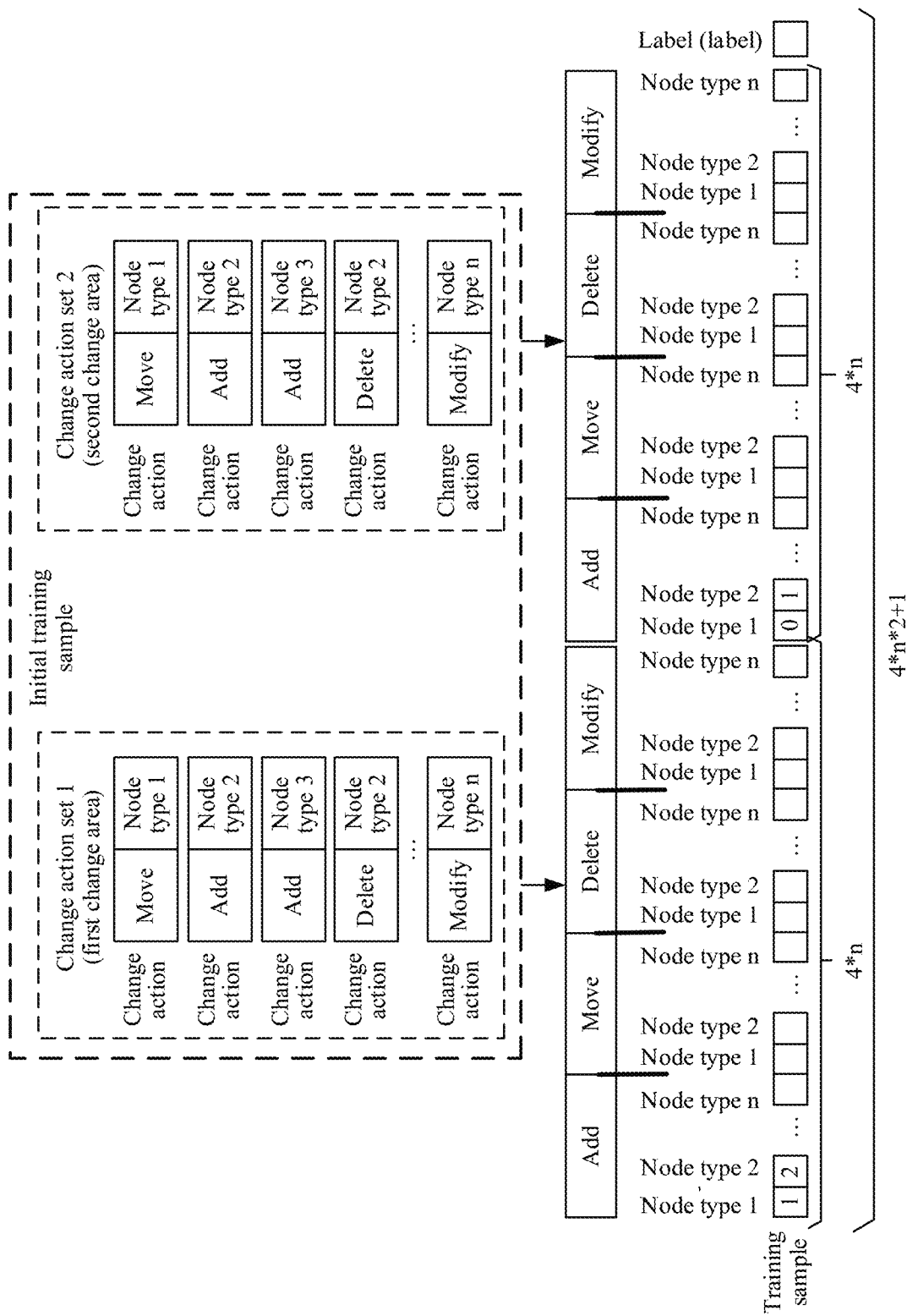
FIG. 5 is a schematic diagram of constructing a training sample according to this disclosure.

Refer to FIG. 5. The training apparatus separately determines a quantity of change operations of different types under different node types in each change action set in change action sets (for ease of description, a change action set 1 herein is used to represent a change action set of the first change area and a change action set 2 herein is used to represent a change action set of the second change area) of two code change areas (for ease of description, the first change area and the second change area are used to distinguish between the two code change areas) corresponding to a same area in the original code (to distinguish between the original code areas, the code area in the original code is referred to as the original area).

For example, a quantity of node types is n. For a change action set in a code change area corresponding to the original area, the training apparatus traverses change actions included in the change action set. Each time a change action is traversed, a node type and a change operation corresponding to the change action are determined, and a quantity of change operations corresponding to the node type is increased by one. In the foregoing manner, each change action set may be converted into a 4*n-bit vector. Two change action sets may be converted into a 4*n*2-bit vector.

The training apparatus uses, as a training sample, a 4*n*2-bit vector converted from the training initial sample and a label, where the label may indicate a merging policy used when the two change areas are merged. The training apparatus converts the plurality of initial training samples into the plurality of training samples in a same manner.

Figure 6:
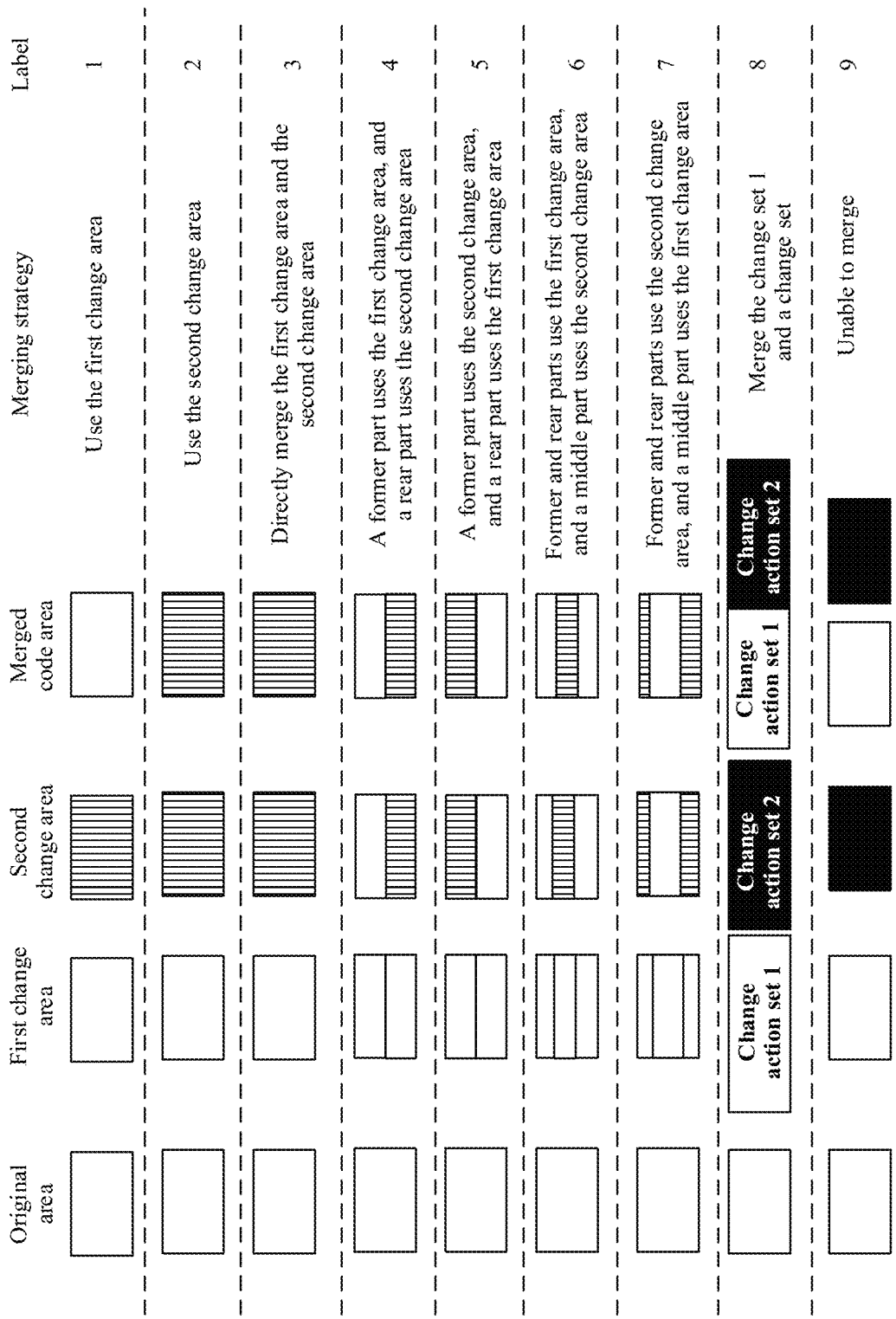
FIG. 6 is a schematic diagram of a correspondence between a label and a merging policy according to this disclosure.

FIG. 6 shows a correspondence between a label and a merging policy according to an embodiment of this disclosure.

An identifier 1 indicates that the merging policy is using a first change area. In this case, an original area is changed in both a first change area and a second change area.

An identifier 2 indicates that the merging policy is using a second change area. In this case, the original area is changed in both the first change area and the second change area.

An identifier 3 indicates that the merging policy is directly merging the first change area and the second change area. In this case, the original area is changed in both the first change area and the second change area.

An identifier 4 indicates that the merging policy is that a front part uses the first change area, and a rear part uses the second change area. In this case, the front part of the original area is changed in the first change area, and the rear part of the original area is changed in the second change area.

An identifier 5 indicates that the merging policy is that the front part uses the second change area, and the rear part uses the first change area. In this case, the rear part of the original area is changed in the first change area, and the front part of the original area is changed in the second change area.

An identifier 6 indicates that the merging policy is that the front and rear parts use the first change area, and the middle part uses the second change area. In this case, the front and rear parts of the original area is changed in the first change area, and a middle part of the original area is changed in the second change area.

An identifier 7 indicates that the merging policy is that the front and rear parts use the second change area, and the middle part uses the first change area. In this case, the middle part of the original area is changed in the first change area, and the front and rear parts of the original area are changed in the second change area.

An identifier 8 indicates that the merging policy is performing merging by using the change set 1 and the change set 2. In this case, the original area is changed in both the first change area and the second change area.

An identifier 9 indicates that merging cannot be performed. In this case, the original area is changed in both the first change area and the second change area.

Therefore, after the training set is constructed, model training is performed based on the training set by using a machine learning method (for example, a random forest algorithm) to obtain a prediction model.

After the training of the prediction model is completed, the explicit conflict elimination module 120 converts the first change action set and the second change action set into the 4*n*2-bit vector in a same manner, inputs the vector into the prediction model, and determines the merging policy based on an output result of the prediction model. The explicit conflict elimination module 120 eliminates the conflict block according to the merging policy.

Figure 7A:
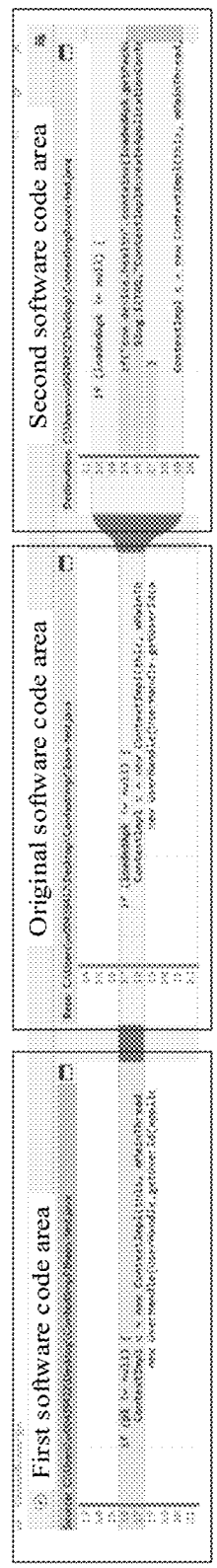
FIG. 7A is a schematic diagram of a conflict block in another software code preliminarily merged version according to this disclosure.

FIG. 7A shows the first code area, the original code area, and the second code area corresponding to another conflict block in the software code preliminarily merged version. A first block diagram is the first code area in the first software code change version, a second block diagram is the original code area in the original software code, and the third block diagram is the second code area in the second software code change version.

Figure 7B:
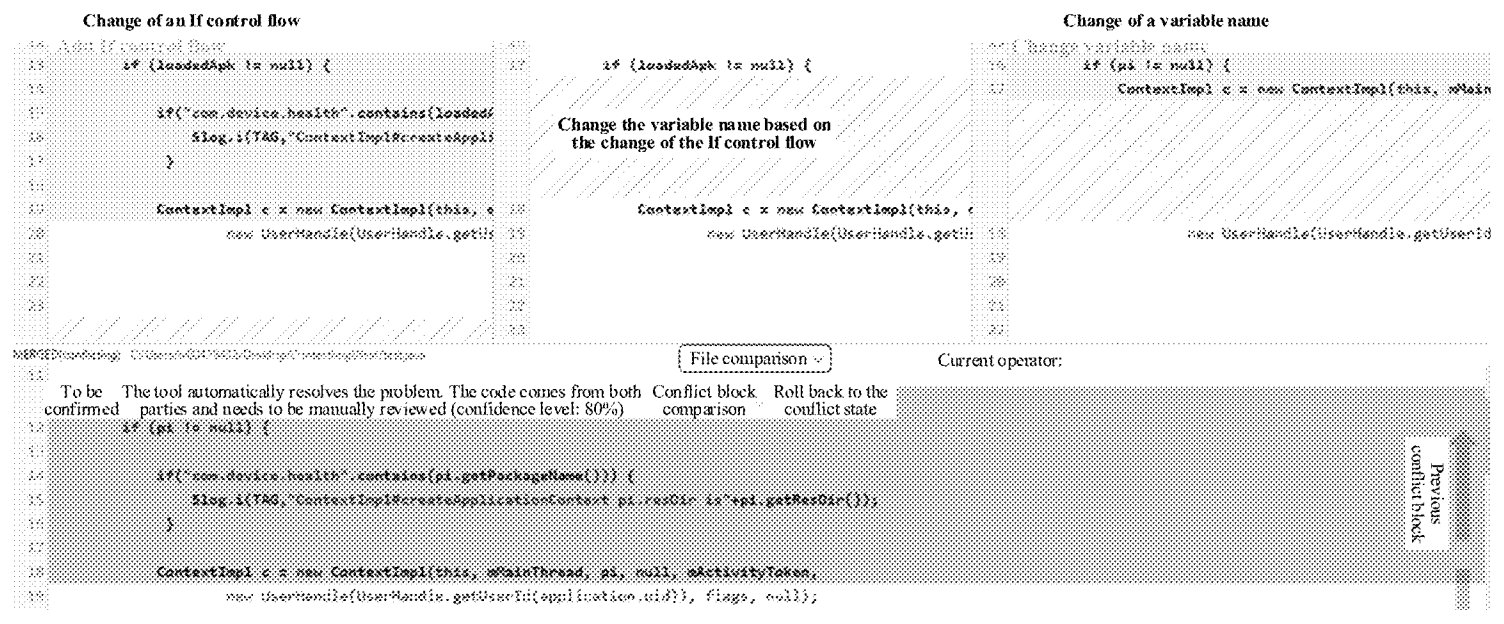

As shown in FIG. 7B, a block diagram in the middle is a result of eliminating a conflict block by using step 202. It may be determined, by using step 201, that a change intent of the first code area is a change in an If control flow, and that a change intent of the second code area is a change in a variable name. The variable name may be changed on the basis of the change in the If control flow.

Figure 8A:
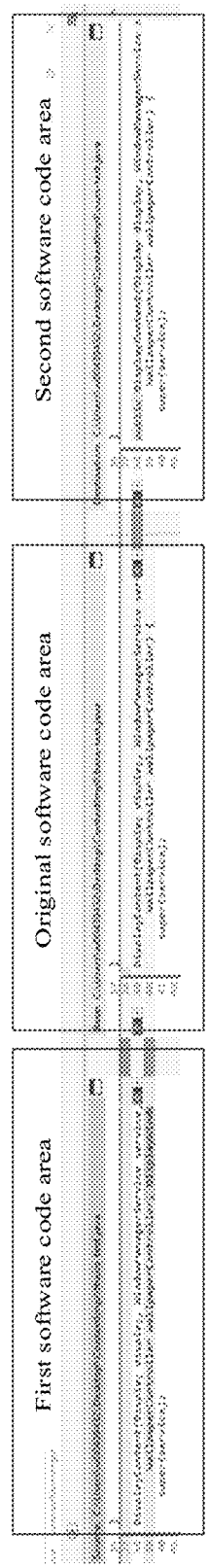
FIG. 8A is a schematic diagram of a conflict block in another software code preliminarily merged version according to this disclosure.

FIG. 8A shows the first code area, the original code area, and the second code area corresponding to another conflict block in the software code preliminarily merged version. A first block diagram is the first code area in the first software code change version, a second block diagram is the original code area in the original software code, and the third block diagram is the second code area in the second software code change version.

Figure 8B:
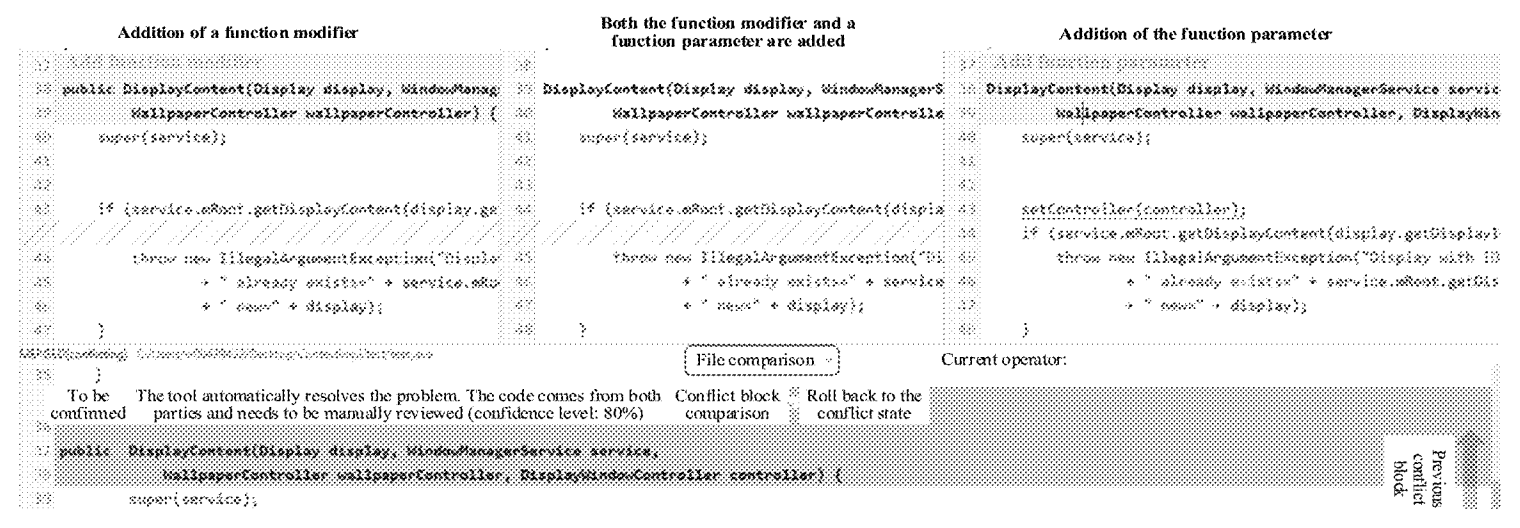

As shown in FIG. 8B, a block diagram in the middle is a result of eliminating a conflict block by using step 202. It may be determined, by using step 201, that a change intent of the first code area is addition of a function modifier, and a change intent of the second code area is addition of a function parameter. The first code area and the second code area may be directly merged, so that both the function modifier and the function parameter are added.

Therefore, it can be learned that, by using the method provided in this embodiment of this disclosure, a conflict in a conflict block in a software code preliminarily merged version can be better eliminated. In addition, by using the method provided in this embodiment of this disclosure, an alarm may be further generated for an implicit conflict in the software code preliminarily merged version. For details, refer to step 203 and step 204.

Step 203: The implicit conflict warning module 130 analyzes unilateral change blocks in the software code preliminarily merged version, and determines an association relationship between unilateral change blocks and an association relationship between unilateral change block and the conflict block.

The implicit conflict warning module 130 analyzes the unilateral change blocks in the software code preliminarily merged version, and analyzes a definition and a use manner of a variable, and a definition and a use manner of a function in each unilateral change block.

The implicit conflict warning module 130 determines the association relationship between the unilateral change blocks and an association relationship between the unilateral change block and the conflict block based on the definition and the use manner of the variable and the definition and the use manner of the function in each unilateral change block that are obtained through analysis.

The association relationship between the unilateral change blocks includes but is not limited to a modification or reference relationship of functions between the unilateral change blocks, and a modification or reference relationship of variables between the unilateral change blocks.

The association relationship between the unilateral change block and the conflict block includes but is not limited to a modification or reference relationship of a function between the unilateral change block and the conflict block, and a modification or reference relationship of a variable between the unilateral change block and the conflict block.

Step 204: The implicit conflict warning module 130 determines, based on the association relationship between the unilateral change blocks and the association relationship between the unilateral change block and the conflict block, an implicit conflict in the software code preliminarily merged version, and prompts that the implicit conflict exists.

The implicit conflict may be classified into two types. One is an implicit conflict caused by the unilateral change blocks that have the association relationship, and the other is an implicit conflict caused by the unilateral change block and the conflict-free conflict block that have the association relationship.

The following lists several implicit conflicts caused by the unilateral change blocks that have the association relationship.

1. A change mode of one unilateral change block is to delete a function or variable. A change mode of the other unilateral change block is to add code, and the added code references the deleted function or variable. The two unilateral change blocks cause an implicit conflict.

For example, an original code area is int a, a code area corresponding to the original code area in the first software code change version is int a, an area corresponding to the original code area in the second software code change version is null (that is, int a is deleted), and a unilateral merged block uses the area corresponding to the original code area in the second software code change version, that is, the variable is deleted.

The other original code area is null, the code area corresponding to the original code area in the first software code change version is a=3 (that is, code is added), the code area corresponding to the original code area in the second software code change version is null (that is, the original code area is not changed), and the unilateral merged block uses the area corresponding to the original code area in the first software code change version, that is, code is added.

There is an implicit conflict between the two unilateral merged blocks.

2. A change mode of one unilateral change block is to modify a function or variable (for example, modifying a function name, a variable name, or a parameter in a function or variable). A change mode of the other unilateral change block is to add code, and the added code references the function or variable obtained before the modification. The two unilateral change blocks cause an implicit conflict.

For example, an original code area is int a, a code area corresponding to the original code area in the first software code change version is int a, a code area corresponding to the original code area in the second software code change version is int b (that is, a variable name of the variable a is modified), and the unilateral merged block uses the code area corresponding to the original code area in the second software code change version, that is, the variable name is modified.

The other original code area is null, the code area corresponding to the original code area in the first software code change version is a=3 (that is, code is added), the code area corresponding to the original code area in the second software code change version is null (that is, the original code area is not changed), and the unilateral merged block uses the area corresponding to the original code area in the first software code change version, that is, code is added.

There is an implicit conflict between the two unilateral merged blocks.

The following lists several implicit conflicts caused by the unilateral change block and the conflict-free conflict block that have the association relationship.

It should be noted that, the conflict block obtained after the conflict is eliminated herein refers to a code area obtained after the conflict block is eliminated, that is, a code area obtained after different change manners in the conflict block are merged. The manner of eliminating the conflict block is not limited herein, and the conflict block may be eliminated in the manner of step 202, or another manner may be used, for example, manually eliminating the conflict block.

1. A change mode of a unilateral change block is to delete a function or variable. The conflict block obtained after the conflict is eliminated references the deleted function or variable. In this case, the unilateral change block and the conflict block obtained after the conflict is eliminated will cause an implicit conflict.

For example, an original code area is int a, a code area corresponding to the original code area in the first software code change version is int a, a code area corresponding to the original code area in the second software code change version is int b (that is, a variable name of the variable a is modified), and the unilateral merged block uses the code area corresponding to the original code area in the second software code change version, that is, the variable is modified.

The other original code area is a=2, the first software code area of the original code area in the first software code change version is a=3 (that is, code is modified), and the second software code area of the original code area in the second software code change version is null (that is, code is deleted). In this case, a conflict, that is, a conflict block, exists between the first software code area and the second code area. The first software code area is selected when the conflict block is eliminated.

There is an implicit conflict between the unilateral merged block and the conflict block obtained after the conflict is eliminated.

2. A change mode of a unilateral change block is to modify a function or variable. The conflict block obtained after the conflict is eliminated references the modified function or variable. In this case, the unilateral change block and the conflict block obtained after the conflict is eliminated will cause an implicit conflict.

For example, an original code area is int a, a code area corresponding to the original code area in the first software code change version is int a, a code area corresponding to the original code area in the second software code change version is null (that is, int a is deleted), and the unilateral merged block uses the code area corresponding to the original code area in the second software code change version, that is, the variable is deleted.

The other original code area is a=2, the first software code area of the original code area in the first software code change version is a=3 (that is, a variable is modified), and the second software code area of the original code area in the second software code change version is b=3 (that is, a variable is modified). In this case, a conflict, that is, a conflict block, exists between the first software code area and the second code area. The first software code area is selected when the conflict block is eliminated.

There is an implicit conflict between the unilateral merged block and the conflict block obtained after the conflict is eliminated.

3. A function or variable is modified in the conflict block obtained after the conflict is eliminated, and a unilateral change block references the modified function or variable. In this case, the unilateral change block and the conflict block obtained after the conflict is eliminated will cause an implicit conflict.

For example, an original code area is func1( ){ac;}, a first software code area of the original code area in the first software code change version is <func1( ){ab;} (that is, a function is modified), and a second software code area of the original code area in the second software code change version is func2(int p), that is, a function is modified. In this case, a conflict, that is, a conflict block, exists between the first software code area and the second code area. When the conflict of the conflict block is eliminated, the first software code area is selected.

The other original code area is func1( ), a code area corresponding to the original code area in the first software code change version is func1( ), a code area corresponding to the original code area in the second software code change version is func2(3) (that is, a called function is modified), and the unilateral merged block uses the code area corresponding to the original code area in the second software code change version, that is, the called function is modified.

There is an implicit conflict between the unilateral merged block and the conflict block obtained after the conflict is eliminated.

4. For a conflict block, the first software code area modifies an initial value of the variable, the second software code area deletes the variable, and the second software code area is used when the conflict of the conflict block is eliminated. A unilateral change block adds code, and the added code references the variable. In this case, the unilateral change block and the conflict block obtained after the conflict is eliminated will cause an implicit conflict.

For example, an original code area is int a=1, the first software code area of the original code area in the first software code change version is int a=2 (that is, the initial value of the variable is modified), and the second software code area of the original code area in the second software code change version is null, that is, the initial value of the variable is deleted. In this case, a conflict, that is, a conflict block, exists between the first software code area and the second code area. The second software code area is selected when the conflict of the conflict block is eliminated.

The other original code area is null, a code area corresponding to the original code area in the first software code change version is a++(the variable is referenced), a code area corresponding to the original code area in the second software code change version is null (that is, no modification is performed), and the unilateral merged block uses the code area corresponding to the original code area in the first software code change version, that is, the variable is referenced.

There is an implicit conflict between the unilateral merged block and the conflict block obtained after the conflict is eliminated.

5. For a conflict block, the first software code area modifies the initial value of the variable, the second software code area changes the variable name of the variable, and the second software code area is used when the conflict of the conflict block is eliminated. A unilateral change block adds code, and the added code references the variable. In this case, the unilateral change block and the conflict block obtained after the conflict is eliminated will cause an implicit conflict.

For example, an original code area is int a=1, a first software code area of the original code area in the first software code change version is int a=2 (that is, an initial value of a variable is modified), and a second software code area of the original code area in the second software code change version is int b=1, that is, a variable name of the variable is modified. In this case, a conflict exists between the first software code area and the second code area, that is, a conflict block. The first software code area is selected when the conflict of the conflict block is eliminated.

The other original code area is null, a code area corresponding to the original code area in the first software code change version is a++(the variable is referenced), a code area corresponding to the original code area in the second software code change version is null (that is, no modification is performed), and the unilateral merged block uses the code area corresponding to the original code area in the first software code change version, that is, the variable is referenced.

There is an implicit conflict between the unilateral merged block and the conflict block obtained after the conflict is eliminated.

After the conflict block in the software code preliminarily merged version is eliminated, or the implicit conflict in the conflict block in the software code preliminarily merged version is found, the software code merged version may be output. The software code merged version may be a software code preliminarily merged versions in which the conflict block is eliminated, or a software code preliminarily merged version in which the implicit conflict is found. The software code merged version may alternatively be a software code preliminarily merged version without the conflict block and the implicit conflict is found.

Figure 9:
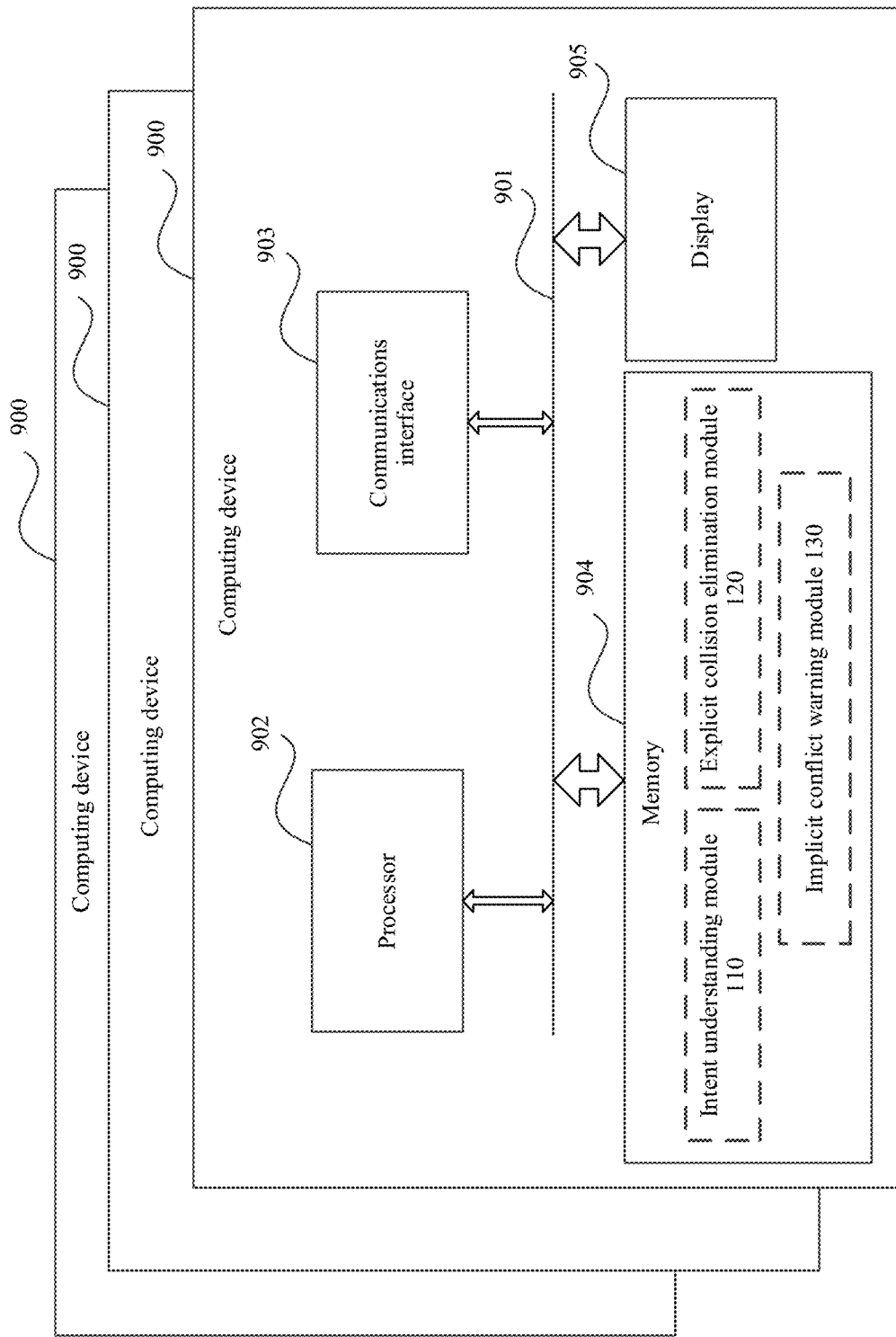
FIG. 9 is a schematic diagram of a structure of a computer cluster according to this disclosure.

Based on a same concept as the method embodiments, an embodiment of this disclosure further provides a computer cluster, configured to perform the method shown in the foregoing method embodiments. For related features, refer to the foregoing method embodiments. Details are not described herein again. FIG. 9 shows a computer cluster provided in an embodiment of this disclosure. The computer cluster includes a plurality of computing devices 900, and a communication path is established between the computing devices 900 by using a communications network.

Each computing device 900 includes a bus 901, a processor 902, a communications interface 903, and a memory 904. Optionally, the computing device 900 may further include a display 905. The processor 902, the memory 904, and the communications interface 903 communicate with each other through the bus 901.

The processor 902 may include one or more general-purpose processors, for example, a central processing unit (CPU), or a combination of a CPU and a hardware chip. The hardware chip may be an application-specific integrated circuit (ASIC), a programmable logic device (PLD), or a combination thereof. The PLD may be a complex PLD (CPLD), a field-programmable gate array (FPGA), generic array logic (GAL), or any combination thereof.

The memory 904 may include a volatile memory, for example, a RAM. The memory 904 may further include a non-volatile memory (NVM), for example, a read-only memory (ROM), a flash memory, an HDD, or an SSD. The memory 904 may further include a combination of the foregoing types.

The memory 904 stores executable code. The processor 902 may read the executable code in the memory 904 to implement a function, or may communicate with another computing device by using the communications interface 903. The processor 902 may further trigger the display 905 to display information to a user, for example, information in FIG. 3B, FIG. 7B, and FIG. 8B in this embodiment of this disclosure, or may display a software code merged version. In this embodiment of this disclosure, the processor 902 may implement functions of one or more modules (for example, one or more of the intent understanding module 110, the explicit conflict elimination module 120, and the implicit conflict warning module 130) of the merging apparatus 100. In this case, the memory 904 stores one or more modules (for example, one or more of the intent understanding module 110, the explicit conflict elimination module 120, and the implicit conflict warning module 130) of the merging apparatus 100.

In this embodiment of this disclosure, the processors 902 in the plurality of computing devices 900 may work in a coordinated manner, to perform the method for merging a plurality of software code change versions provided in the embodiments of this disclosure.

Figure 10:
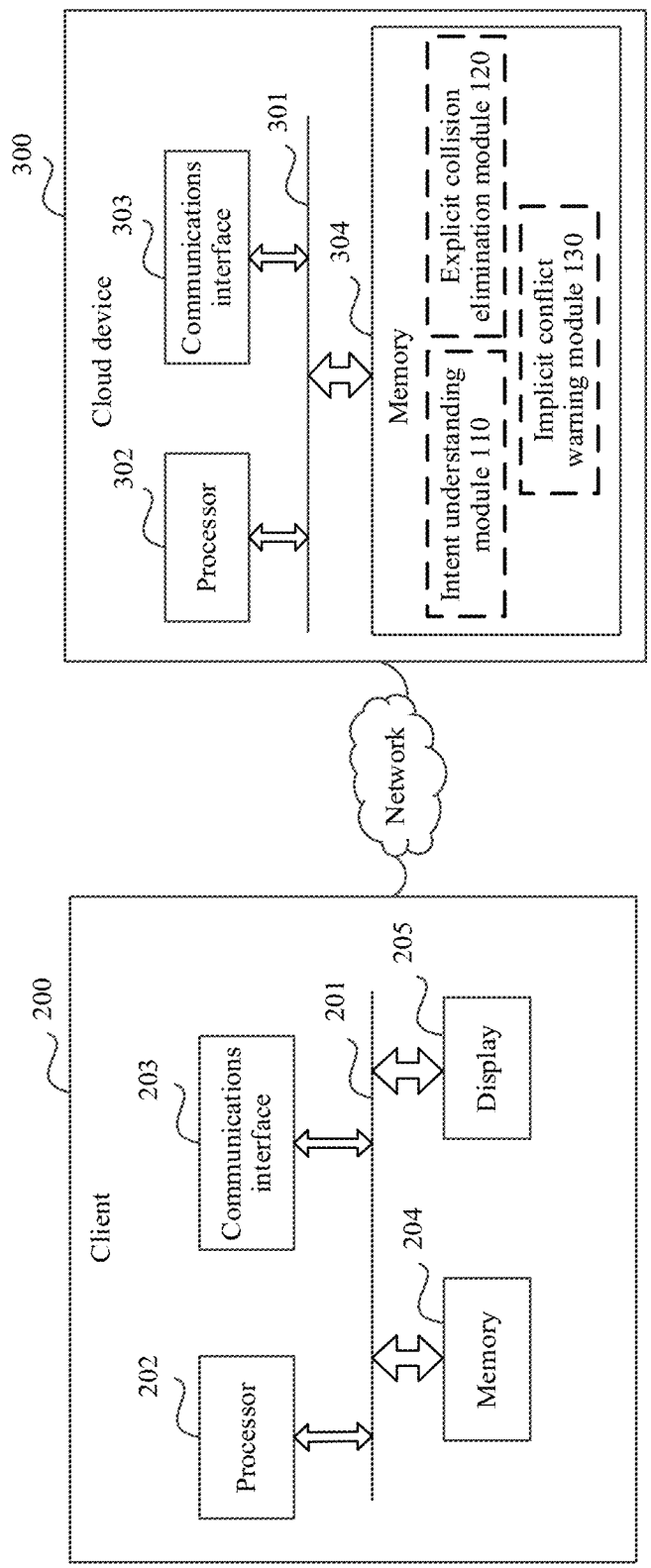
FIG. 10 is a schematic diagram of a structure of a system according to this disclosure.

FIG. 10 shows a system architecture according to an embodiment of this disclosure. The system architecture includes a client 200 and a cloud device 300 on which a change apparatus is deployed. The client 200 is connected to the cloud device 300 by using a network. The cloud device 300 is located in a cloud environment, and may be a server or a virtual machine deployed in a cloud data center. FIG. 10 shows only an example in which the merged apparatus 100 is deployed on one cloud device 300. In a possible implementation, the merged apparatus may be deployed on a plurality of cloud devices 300 in a distributed manner.

As shown in FIG. 10, the client 200 includes a bus 201, a processor 202, a communications interface 203, a memory 204, and a display 205. The processor 202, the memory 204, and the communications interface 203 communicate with each other through the bus 201. For types of the processor 202 and the memory 204, refer to related descriptions of the processor 902 and the memory 904. Details are not described herein again. The memory 204 stores executable code, and the processor 202 may read the executable code in the memory 204 to implement a function. The processor 202 may further trigger the display 205 to display information to the user, for example, information in FIG. 3B, FIG. 7B, and FIG. 8B in this embodiment of this disclosure, and may further display a software code merged version. The processor 202 may further communicate with the cloud device 300 through the communications interface 203. For example, the processor 202 may prompt, by using the display 205, the user to select the original software code, the software code preliminarily merged version, the first software code change version, and the second software code change version, and feed back the architecture information to the cloud device 300 by using the communications interface 203. Alternatively, the processor 202 may receive, by using the communications interface 203, a software code merged version that eliminates a conflict block and that prompts an implicit conflict, and displays the software code merged version by using the display 205.

As shown in FIG. 10, the cloud device 300 includes a bus 301, a processor 302, a communications interface 303, and a memory 304. The processor 302, the memory 304, and the communications interface 303 communicate with each other through the bus 301. For types of the processor 302 and the memory 304, refer to related descriptions of the processor 902 and the memory 904. Details are not described herein again. The memory 304 stores executable code. The processor 302 may read the executable code stored in the memory 304 to implement a function, and may further communicate with the client 200 through the communications interface 303. In this embodiment of this disclosure, the processor 302 may implement a function of the merging apparatus 100. In this case, the memory 304 stores one or more of a receiving module 110, a construction module 120, and a display module 130 of the merging apparatus 100.

After receiving the original software code, the software code preliminarily merged version, the first software code change version, and the second software code change version from the client 200 by using the communications interface 303, the processor 302 may invoke a module stored in the memory 304 to implement the method for merging a plurality of software code change versions provided in this embodiment of this disclosure, to generate a software code merged version. The processor 302 may send the software code merged version to the client 200 by using the communications interface 303.

In the several embodiments provided in this disclosure, it should be understood that, the disclosed system, apparatuses, and methods may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and parts displayed as units may or may not be physical units, to be specific, may be located in one position, or may be distributed on a plurality of network units. Some or all of the units may be selected based on an actual requirement, to achieve the objectives of the solutions in embodiments.

The foregoing descriptions are merely specific implementations of the present disclosure. Any variation or replacement figured out by a person skilled in the art according to the specific implementations provided in the present disclosure shall fall within the protection scope of the present disclosure.

What is claimed is:

1. A method for merging a plurality of software code change versions, the method comprising:
   obtaining, based on original software code that has been changed, both a first software code change version of a conflict block in a software code preliminarily merged version and a second software code change version of the conflict block;
   analyzing both a first code area in the first software code change version and a second code area in the second software code change version;
   determining, based on analyzing both the first code area in the first software code change version and the second code area in the second software code change version, a first change intent of the first code area in the first software code change version and a second change intent of the second code area in the second software code change version; and
   eliminating the conflict block based on a conflict elimination rule set, the first change intent of the first code area in the first software code change version, and the second change intent of the second code area in the second software code change version,
   wherein the conflict elimination rule set comprises at least one conflict elimination rule, and
   wherein each of the at least one conflict elimination rule records a conflict elimination solution used for merging code change areas in different software code change versions for conflict blocks.

2. The method of claim 1, further comprising invoking a prediction model to eliminate the conflict block, wherein the prediction model is configured to output the conflict elimination solution based on an input conflict block.

3. The method of claim 1, further comprising:
analyzing the conflict block and a first unilateral change block in the software code preliminarily merged version;
determining, based on analyzing the conflict block and the first unilateral change block in the software code preliminarily merged version, a first association relationship between second unilateral change blocks and a second association relationship between the first unilateral change block and the conflict block; and
prompting, based on the first association relationship and the second association relationship, that an implicit conflict exists.

4. The method of claim 3, wherein the first association relationship comprises a first modification or reference relationship of a first function between the second unilateral change blocks, and wherein the second association relationship comprises a second modification or reference relationship of a second function between the first unilateral change block and the conflict block.

5. The method of claim 3, wherein the first association relationship comprises a first modification or reference relationship of a function between the second unilateral change blocks, and wherein the second association relationship comprises a second modification or reference relationship of a variable between the first unilateral change block and the conflict block.

6. The method of claim 3, wherein the first association relationship comprises a first modification or reference relationship of a variable between the second unilateral change blocks, and wherein the second association relationship comprises a second modification or reference relationship of a function between the first unilateral change block and the conflict block.

7. The method of claim 3, wherein the first association relationship comprises a first modification or reference relationship of a first variable between the second unilateral change blocks, and wherein the second association relationship comprises a second modification or reference relationship of a second variable between the first unilateral change block and the conflict block.

8. The method of claim 1, further comprising:
invoking a plurality of change analyzers to analyze a first change action set, wherein the first change action set records a first change action in the first code area in the first software code change version for the original software code;
determining, based on analyzing the first change action set, the first change intent of the first code area in the first software code change version;
invoking the plurality of change analyzers to analyze a second change action set, wherein the second change action set records a second change action in the second code area in the second software code change version for the original software code, and wherein one of the plurality of change analyzers is configured to analyze one type of statement, variable, function, or class in the first change action set and the second change action set; and
determining, based on analyzing the second change action set, the second change intent of the second code area in the second software code change version.

9. The method of claim 8, further comprising:
constructing a first syntax tree of the original software code, a second syntax tree of the first software code change version, and a third syntax tree of the second software code change version;
determining, based on the first syntax tree of the original software code and the second syntax tree of the first software code change version, the first change action set; and
determining, based on the first syntax tree of the original software code and the third syntax tree of the second software code change version, the second change action set.

10. A computing device cluster comprising a plurality of computing devices, wherein the plurality of computing devices comprise:
a memory configured to store computer program instructions; and
a processor coupled to the memory and configured to execute the computer program instructions to cause the computing device cluster to:
obtain, based on original software code that has been changed, both a first software code change version of a conflict block in a software code preliminarily merged version and a second software code change version of the conflict block;
analyze both a first code area in the first software code change version and a second code area in the second software code change version;
determine, based on analyzing both the first code area in the first software code change version and the second code area in the second software code change version, a first change intent of the first code area in the first software code change version and a second change intent of the second code area in the second software code change version; and
eliminate the conflict block based on a conflict elimination rule set, the first change intent of the first code area in the first software code change version, and the second change intent of the second code area in the second software code change version,
wherein the conflict elimination rule set comprises at least one conflict elimination rule, and
wherein each of the at least one conflict elimination rule records a conflict elimination solution used for merging code change areas in different software code change versions for conflict blocks.

11. The computing device cluster of claim 10, wherein the processor is further configured to execute the computer program instructions to cause the computing device cluster to invoke a prediction model to eliminate the conflict block, and wherein the prediction model is configured to output the conflict elimination solution based on an input conflict block.

12. The computing device cluster of claim 10, wherein the processor is further configured to execute the computer program instructions to cause the computing device cluster to:
analyze the conflict block and a first unilateral change block in the software code preliminarily merged version;
determine, based on analyzing the conflict block and the first unilateral change block in the software code preliminarily merged version, a first association relationship between second unilateral change blocks and a second association relationship between the first unilateral change block and the conflict block; and
prompt, based on the first association relationship and the second association relationship, that an implicit conflict exists.

13. The computing device cluster of claim 12, wherein the first association relationship comprises a first modification or reference relationship of a first function between the second unilateral change blocks, and wherein the second association relationship comprises a second modification or reference relationship of a second function between the first unilateral change block and the conflict block.

14. The computing device cluster of claim 12, wherein the first association relationship comprises a first modification or reference relationship of a function between the second unilateral change blocks, and wherein the second association relationship comprises a second modification or reference relationship of a variable between the first unilateral change block and the conflict block.

15. The computing device cluster of claim 12, wherein the first association relationship comprises a first modification or reference relationship of a variable between the second unilateral change blocks, and wherein the second association relationship comprises a second modification or reference relationship of a function between the first unilateral change block and the conflict block.

16. The computing device cluster of claim 12, wherein the first association relationship comprises a first modification or reference relationship of a first variable between the second unilateral change blocks, and wherein the second association relationship comprises a second modification or reference relationship of a second variable between the first unilateral change block and the conflict block.

17. The computing device cluster of claim 10, wherein the processor is further configured to execute the computer program instructions to cause the computing device cluster to:
invoke a plurality of change analyzers to analyze a first change action set, wherein the first change action set records a first change action in the first code area in the first software code change version for the original software code;
determine, based on analyzing the first change action set, the first change intent of the first code area in the first software code change version;
invoke the plurality of change analyzers to analyze a second change action set, wherein the second change action set records a second change action in the second code area in the second software code change version for the original software code, and wherein one of the plurality of change analyzers is configured to analyze one type of statement, variable, function, or class in the first change action set and the second change action set; and
determine, based on analyzing the second change action set, the second change intent of the second code area in the second software code change version.

18. The computing device cluster of claim 17, wherein the processor is further configured to execute the computer program instructions to cause the computing device cluster to:
construct a first syntax tree of the original software code, a second syntax tree of the first software code change version, and a third syntax tree of the second software code change version;
determine, based on the first syntax tree of the original software code and the second syntax tree of the first software code change version, the first change action set; and
determine, based on the first syntax tree of the original software code and the third syntax tree of the second software code change version, the second change action set.

19. A computer program product comprising computer-executable instructions that are stored on a non-transitory computer-readable medium and that, when executed by a processor of an apparatus, cause the apparatus to:
obtain, based on original software code that has been changed, both a first software code change version of a conflict block in a software code preliminarily merged version and a second software code change version of the conflict block;
analyze both a first code area in the first software code change version and a second code area in the second software code change version;
determine, based on analyzing both the first code area in the first software code change version and the second code area in the second software code change version, a first change intent of the first code area in the first software code change version and a second change intent of the second code area in the second software code change version; and
eliminate the conflict block based on a conflict elimination rule set, the first change intent of the first code area in the first software code change version, and the second change intent of the second code area in the second software code change version,
wherein the conflict elimination rule set comprises at least one conflict elimination rule, and
wherein each of the at least one conflict elimination rule records a conflict elimination solution used for merging code change areas in different software code change versions for conflict blocks.

20. The computer program product of claim 19, wherein the computer-executable instructions further cause the apparatus to invoke a prediction model to eliminate the conflict block, and wherein the prediction model is configured to output the conflict elimination solution based on an input conflict block.

* * * * *